United States Patent
Neisius

(10) Patent No.: US 10,776,942 B2
(45) Date of Patent: Sep. 15, 2020

(54) METHOD OF DETERMINING THE ROLL ANGLE OF A VEHICLE MOUNTED CAMERA

(71) Applicant: Aptiv Technologies Limited, St. Michael (BB)

(72) Inventor: Diane Neisius, Cologne (DE)

(73) Assignee: Aptiv Technologies Limited, St. Michael (BB)

( * ) Notice: Subject to any disclaimer, the term of this patent is extended or adjusted under 35 U.S.C. 154(b) by 128 days.

(21) Appl. No.: 16/031,151

(22) Filed: Jul. 10, 2018

(65) Prior Publication Data

US 2019/0035107 A1 Jan. 31, 2019

(30) Foreign Application Priority Data

Jul. 26, 2017 (EP) ..................................... 17183328

(51) Int. Cl.
*G06K 9/00* (2006.01)
*G06T 7/73* (2017.01)
(Continued)

(52) U.S. Cl.
CPC .................. *G06T 7/73* (2017.01); *G06T 7/50* (2017.01); *G06T 7/80* (2017.01); *G06T 2207/30244* (2013.01); *G06T 2207/30256* (2013.01)

(58) Field of Classification Search
CPC .... G06T 7/73; G06T 7/50; G06T 7/80; G06T 7/62; G06T 2207/30256;
(Continued)

(56) References Cited

U.S. PATENT DOCUMENTS 6,535,114 B1 * 3/2003 Suzuki .................. G06T 7/20
340/435
2010/0034426 A1 * 2/2010 Takiguchi .......... G01C 21/3602
382/106

(Continued)

FOREIGN PATENT DOCUMENTS

WO   WO-2015160287 A1 * 10/2015 ............... G09B 9/48

*Primary Examiner* — Jose L Couso
(74) *Attorney, Agent, or Firm* — Colby Nipper PLLC

(57) ABSTRACT

A method of determining the roll angle of a camera mounted on a host vehicle includes:
a) defining Cartesian axes in the real world and corresponding axes in the camera imager;
b) from an image taken from the camera, determining the co-ordinates of the two points (P1, P2) of the real world, in the imager of the camera ((x I,1, y I,1), (x I,2, y I,2));
c) determining the difference (D) in the coordinates of the points in a horizontal World plane in one axis (Xw,1−Xw,2), using corresponding co-ordinate system as in step b); and
d) determining the roll angle ρ of a camera located on a host vehicle from the following formula $$\rho=[D/h-(c_2/a_2-c_1/a_1)]/[(a_2d_2-b_2c_2)/a_2^2-(a_1d_1-b_1c_1)/a_1^2],$$

where $a_1$ and $a_2$ are found from the following, where i=1,2 represents the two points (P1, P2):

$a_i = \sin\theta \ast f + \cos\theta \ast y_{I,i};$ $b_i = -\cos\theta \ast x_{I,i}$ $c_i = -\cos\eta \cos\theta \ast f + \sin\eta \ast x_{I,i} + \cos\eta \sin\theta \ast y_{I,i}$ $d_i = -\cos\eta \sin\theta \ast x_{I,i} + \sin\eta \ast y_{I,i}$ (Continued)

where for θ is the known value of fixed tilt angle, η is the known value of fixed pan angle and h is the known fixed camera height h; and $x_{I,i}$, $y_{I,i}$ are the respective co-ordinates of two of the points in the imager.

4 Claims, 5 Drawing Sheets

(51) Int. Cl.
*G06T 7/80* (2017.01)
*G06T 7/50* (2017.01)

(58) Field of Classification Search
CPC . G06T 2207/30244; G06T 2207/10016; G06T 2207/30252; G01C 11/00; G01C 21/32; H04N 1/3878; B60R 2300/402; G01B 11/26; G06K 9/00791; G06K 9/00798; G06K 2009/3225
See application file for complete search history.

(56) References Cited

U.S. PATENT DOCUMENTS

| | | | |
|---|---|---|---|
| 2010/0231717 A1* | 9/2010 | Sasaki | G06T 5/006 348/148 |
| 2010/0321489 A1* | 12/2010 | Chen | G01C 11/02 348/116 |
| 2010/0321490 A1 | 12/2010 | Chen et al. | |
| 2013/0222607 A1* | 8/2013 | Oshima | H04N 17/002 348/188 |
| 2015/0161456 A1* | 6/2015 | Chevalley | G01B 11/00 348/148 |
| 2015/0287197 A1* | 10/2015 | Nakai | G06T 7/80 348/187 |
| 2017/0032688 A1* | 2/2017 | Nakayama | G09B 19/167 |
| 2019/0156512 A1* | 5/2019 | Kato | G06T 7/73 |
| 2019/0259180 A1* | 8/2019 | Tanaka | H04N 5/225 |
| 2019/0279386 A1* | 9/2019 | Motohashi | G06T 3/20 |

* cited by examiner

METHOD OF DETERMINING THE ROLL ANGLE OF A VEHICLE MOUNTED CAMERA

TECHNICAL FIELD OF INVENTION

This disclosure generally relates to a method of determining the roll angle of a camera mounted on a host vehicle, and in particular to the calibration and determination of the camera roll angle, and can be used in Advanced Driver Assisted Systems.

BACKGROUND OF INVENTION

It is known to equip vehicles with radar systems and/or cameras systems in order to characterize the environment surrounding a vehicle. Such systems are able to provide detection of objects in the vicinity of the vehicle, in particular in a forward-looking direction. In such systems, processing of image data and/or radar reflection data allows objects in the vicinity of the vehicle to be detected and characterized. Such object identification or detection can be used to detect static objects such as guardrails, walls, trees, boundaries, posts or stationary vehicles for example, or moving objects such as other vehicles or pedestrians. In such Advanced Driver Assisted Systems (ADAS systems) both cameras mounted on the vehicle and/or antenna arrays may be used to detect/identify and characterize such objects Although methods are known for camera pan and tilt angle estimation as well as for camera height calibration and auto-calibration; prior art methods have tended to ignore the roll angle of the camera which had to be assumed negligible.

Recently there has been a survey about an Optical Flow based method of camera angle estimation which includes roll (Westerhoff, J., Lessmann, S. et al.: Development and Comparison of Homography based Estimation Techniques for Camera to Road Surface Orientation, 2016 IEEE IV Symposium, Gotenburg). However, since Optical Flow calculations are expensive in terms of computational power, this may not be convenient for low-cost embedded systems so there is still need for some simple roll estimation method.

As long as camera auto-calibration is performed for passenger cars only, this might not pose a major problem. Passenger cars are not expected to carry large loads which may change drastically over a working day thus affecting the roll or tilt (sideways). But for trucks which may service a number of customer locations over the day, loading and unloading freight may affect the tilt and thus roll perspective. Change in uneven freight weight clearly changes forces on the truck's suspension system thus all camera angles (including roll) change.

Moreover, as OEM expectations of vision algorithm precision increase with every new camera generation, the assumption of negligible roll angle may not even hold for passenger cars any longer. A camera which relies on a constant roll angle in its auto-calibration is at risk of reduced performance or malfunction. For example, current Lane Detection algorithms detect not only the ego lane but also neighboring lanes. These are of course at larger distances from the vehicle so roll angle inaccuracies introduce errors which are no longer negligible.

The suspension system of a truck can affect camera roll by itself in a dynamical manner. Pneumatic springs can be regulated up to +/−20 cm in height to compensate for heavy freight load (which in turn affects the height, too), or to improve driving comfort on bad conditioned ground. The latter can happen even in mid-drive, not only at loading stops.

The problem of camera roll angle calibration for truck now becomes important since the EU regulation 351/2012 LDWS requires in future all commercial trucks in the EU to be equipped with a Lane Departure Warning system and an Emergency Automatic Brake System. For camera based systems of this kind this clearly needs for increased precision in calibration, including camera roll angle.

SUMMARY OF THE INVENTION

Described herein is a method of determining (estimating) the roll angle of a camera mounted on a vehicle, which not use onerous processing powers.

In one aspect is provided a method of determining the roll angle of a camera mounted on a host vehicle comprising: defining Cartesian axes in the real world and corresponding axes in said camera imager, from an image taken from said camera, determining the co-ordinates of the two points (P1, P2) of the real world, in the imager of the camera ((x I,1, y I,1), (x I,2, y I,2)), determining the difference (D) in the coordinates of said points in a horizontal World plane in one axis (Xw,1−Xw,2), using corresponding co-ordinate system as in step b), determining the roll angle ρ of a camera located on a host vehicle from the following formula:

$$\rho = [D/h(c_2/a_2 - c_1 a_1)] / [(a_2 d_2 - b_2 c_2)/a_2^2 - (a_1 d_1 - b_1 c_1)/a_1^2],$$

where $a_1$ and $a_2$ are found from the following, where i=1,2 represents the two points (P1,P2):

$$a_i = \sin \theta * f + \cos \theta * y_{I,i}$$

$$b_i = -\cos \theta * x_{I,i}$$

$$c_i = -\cos \eta \cos \theta * f + \sin \eta * x_{I,i} + \cos \eta \sin \theta * y_{I,i}$$

$$d_i = -\cos \eta \sin \theta * x_{I,i} + \sin \eta * y_{I,i}$$

where for θ is the known value of fixed tilt angle, η is the known value of fixed pan angle and h is the known fixed camera height h; and $x_{I,i}$, $y_{I,i}$ are the respective co-ordinates of two said points in the imager.

In step a) the axes may be defined as a X-axis which is in the direction of travel or the orientation of the vehicle forwards and the Y axis is perpendicular to the X axis.

Step c) may be performed using data from the known co-ordinate position of the two points in the real World.

Said points may be the end points of a lane marking, said lane marking being of pre-determined length (L), and determining the value of said difference D from the lane marking length and the known orientation of the camera and/or vehicle angle to the lane marking.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention is now described by way of example with reference to the accompanying drawings in which:

FIG. 4 shows a representation similar to FIG. 3a;

DETAILED DESCRIPTION

Figure 1:
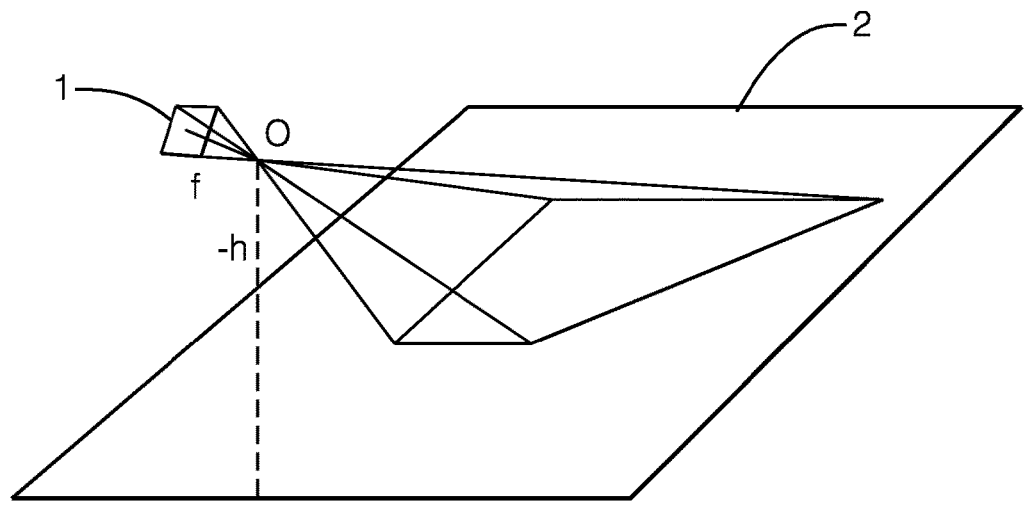
FIG. 1 shows a schematic view of view of a camera imager.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The current inventor has determined a relatively simple formula for overcoming the problem of camera roll angle auto-calibration and determination (e.g. for a driver assistance system). The formulation is based on a combination of Inverse Perspective Mapping, a linearization and Taylor expansion. As a result, the problem of measuring the roll angle can determined from two points on the world ground plane, and so can be determined from appropriate measurement of distance/markers on the world ground plane.

The distance measurement on the ground plane may be performed by detection of dashed or otherwise intermittent lane markers present on the road the vehicle drives on. Auto-correlation of measured rectangular signals from intermittent lane markers is used to estimate the distance between world points.

A linearized/Taylor approximated equation then yields the camera height from the world point distance.

Derivation of the Methodology

Inverse perspective mapping has been used before as an approach to derive image processing methods (see, for example, Mallot, H. A., Biilthoff, H. H., Little, J. J., Bohrer, S.: Inverse Perspective Mapping Simplifies Optical Flow Computation and Obstacle Detection, in: Biological Cybernetics 64 (1991) pp. 177-185). Using the terminology from the cited paper, let O be the origin of three-dimensional space, with a camera imager placed at normal distance f and a ground plane placed at a normal height z=−h below the origin as depicted in FIG. 1. In such a configuration, O is obviously the location of the camera lens center, and the normal on the imager plane through O is the optical axis.

Let further be the co-lineation which projects the space onto the imager, and the co-lineation which projects the space on the ground.

FIG. 1 shows a schematic view of view of a camera imager, the camera which may be mounted on a vehicle at height (−h) from the ground plane. Both the imager and corresponding image is shown with reference numeral 1. The ground plane 2 represents the real word, hence this effectively the horizontal ground plane of the environment in plan view.

Then, for a point (xI,yI) given in an orthonormal imager coordinate system, and a point (xW,yW) given in an orthonormal world coordinate system, and a basis transformation matrix $(q_{ij})i,j=1,2,3$ between the two orthonormal bases, if the imager point is projected onto the world point, it holds $$(x_W, y_W) = \Im^{-1} \circ \wp (x_I, y_I) = -h/[q_{31}x_I + q_{32}y_I - q_{33}f] \cdot (q_{11}x_I + q_{12}y_I - q_{13}f, q_{11}x_I + q_{12}y_I - q_{13}f)$$

The roll angle ρ is buried deep inside the matrix coefficients $q_{ij}$ together with the other angles. A convenient simplification is needed to extract ρ.

Figure 2:
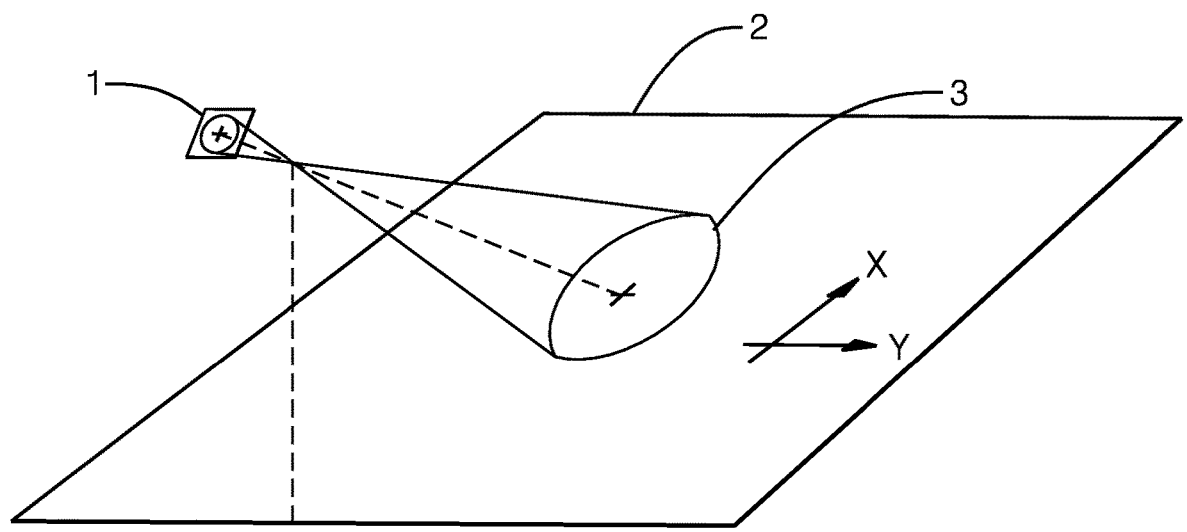
FIG. 2 shows the projection of a fixed point rotates in the imager plane around the optical axis.

With reference to FIG. 2 if it is observed what happens if a fixed point (xI,yI) rotates in the imager plane around the optical axis. (That is exactly what camera roll means.) The curve described by the point in the imager plane obviously is a circle 3.

Since any projection is a straight line from imager point (xI,yI) to world point (xW,yW) through the origin, on rotation around the optical axis, the straight line describes a cone. The intersection of cone and the ground plane obviously is the one of the classical cone sections, i.e., an ellipse, parabola or hyperbola.

In practical situations, camera roll angles are small, a few degrees in either direction from zero. So it may be convenient to approximate sin ρ≈ρ, cos ρ≈1. Algebraic this is equivalent to a linearization of the rotation matrix. Doing so, all expressions inside the coefficients $q_{ij}$ can be resolved now and we yield from the equation above $$x_W = -h(c + d\rho)/(a + b\rho)$$

$$y_W = -h(r + s\Sigma)/(a + b\rho),$$

where for fixed tilt angle θ, fixed pan angle η and fixed camera height h the new coefficients are given by:

$a = \sin\theta * f + \cos\theta * y_i$ $b = -\cos\theta * xi$ $c = -\cos\eta \cos\theta * f + \sin\eta * xi + \cos\eta \sin\theta * yi$ $d = -\cos\eta \sin\theta * xi + \sin\eta * yi$ $r = \sin\eta \cos\theta * f + \cos\eta * xi - \sin\theta \sin\eta * yi$ $s = \sin\theta \sin\eta * xi + \cos\eta * yi$ where $x_i$ and $y_i$ are the co-ordinates in the imager of the point (xw,yw) in World co-ordinates, having corresponding axes, which are all constants here. Since the desired value p is still enclosed in a rational linear polynomial in $\rho$, we do a further linearization by a Taylor expansion in $\rho$:

$X_w = -h(c+d\rho)/(a+b\rho) = -h \, c/a + -h(ad-bc)/a^2 * \rho + O(\rho^2)$ $Y_w = -h(r+s\rho)/(a+b\rho) = -h \, r/a + -h(as-br)/a^2 * \rho + O(\rho^2)$, where the $O(\rho2)$ can be neglected for small values of p. The numerical values of xw and w are now in a linear relation to $\rho$.

Since it is more convenient in an algorithm to use world distance measures rather than absolute world coordinates, the equation above can be brought in an appropriate form. For two world point x coordinates denoted $X_{w,1}$ and $X_{w,2}$ we can do the following:

$X_{w,1} = -hc_1/a_1 + -h(a_1d_1-b_1c_1)/a_1^2 * \rho$ $X_{w,2} = -hc_2/a_2 + -h(a_2d_2-b_2c_2)/a_2^2 * \rho$.

The difference of the x coordinates (in the World plane) gives the x distance:

$D = -hc_1/a_1 - h(a_1d_1-b_1c_1)/a_1^2 * \rho + hc_2/a_2 + h(a_2d_2-b_2c_2)/a_2^2 * \rho$, which can be resolved for $\rho$:

$\rho = [D/h - (c_2/a_2 - c_1/a_1)] / [(a_2d_2-b_2c_2)/a_2^2 - (a_1d_1-b_1c_1)/a_1^2]$.

Worked Example

Figure 3A:
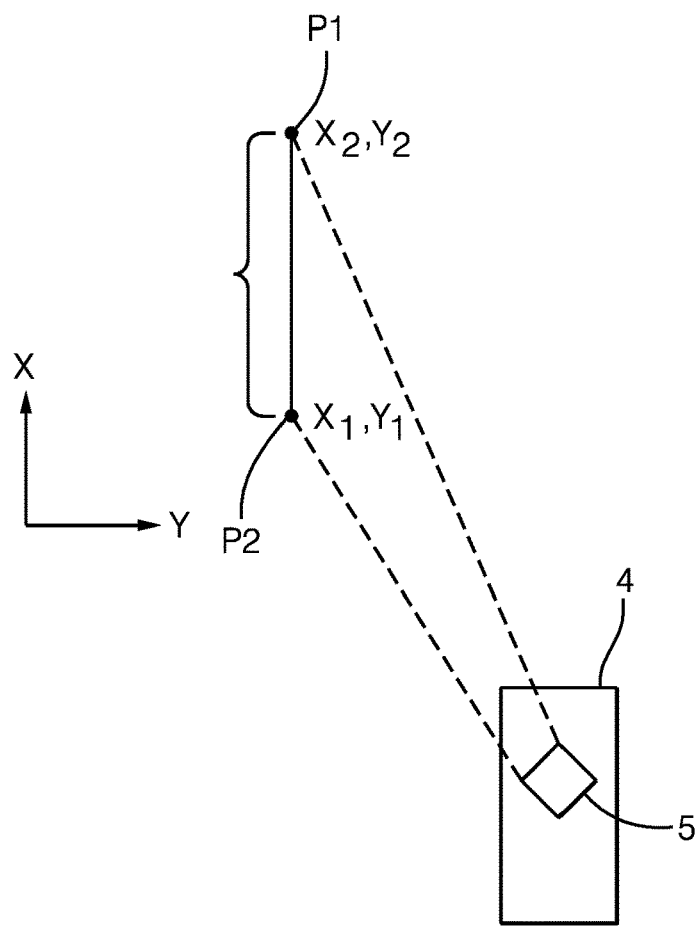
FIG. 3a shows two points in horizontal World plane.

FIG. 3a shows two points on a plan view (horizontal plane) on the ground and thus in a World co-ordinate system, thus equivalent to reference numeral 2 of FIGS. 1 and 2. The figure shows two points P1 and P2; the two points are joined by a line 6. The points may be for example, the ends of a lane marker e.g. white strip painted on a road surface, and so the line may represent the lane marker. Point P1 has co-ordinates designated $X_{w,1}$, $Y_{w,1}$, and point 2 has co-ordinates designated $X_{w,2}$, $Y_{w,2}$, the capitals and the designation "w" indicating point in the World co-ordinate system. The figure shows the location of a host vehicle 4 with camera 5. The camera can take images of the real world as described with reference to FIGS. 1 and 2. It is to be noted that axes are marked as shown, where X axis is defined as the direction of the lane/car movement, Y perpendicular to the lane/car movement (sideways), as is conventional in ADAS systems. Of course, examples of the invention are applicable to other or indeed any co-ordinate and axis systems. The important thing is that the image and world axes correspond to each other.

Figure 3B:
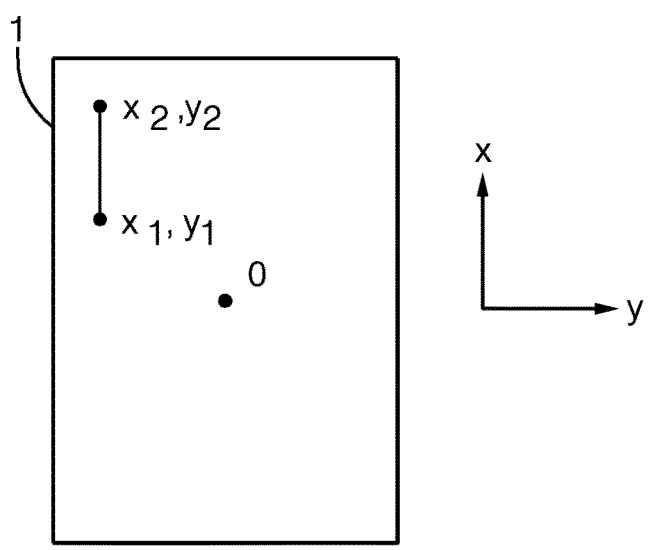
FIG. 3b shows the two points of FIG. 3a in an imager.

FIG. 3b shows the co-ordinates of these respective points on the imager of a camera mounted on a car relative to the origin, which may be the center of the imager. The origin is as defined above, and so line from a ground point that is parallel to the camera orientation (tilt, and pan) would be incident on the origin. The position of the points P1 and P2 on the imager are x I,1, y I,1 and x I,2, y I,2 respectively. The axes in the imager correspond to the axes in the real world.

Step 1

Two points P1 and P2 in the real word are detected on an imager. The points in the real world have real world co-ordinates (XW1,YW1) and (XW2,YW2) respectively. The position of the points on the imager are (xI1, yI1) and (xI2, yI,2) respectively and these latter co-ordinates are used as inputs in the methodology.

Step 2

The inputs to the method also include the tilt and pan angle of the camera and also camera height. Thus, it is assumed these are known and that they have been calibrated correctly. There are several known techniques for doing this as described e.g. in the Applicants co-pending application European Patent Application EP 15 151 429.6.

Step 3

Figure 4:
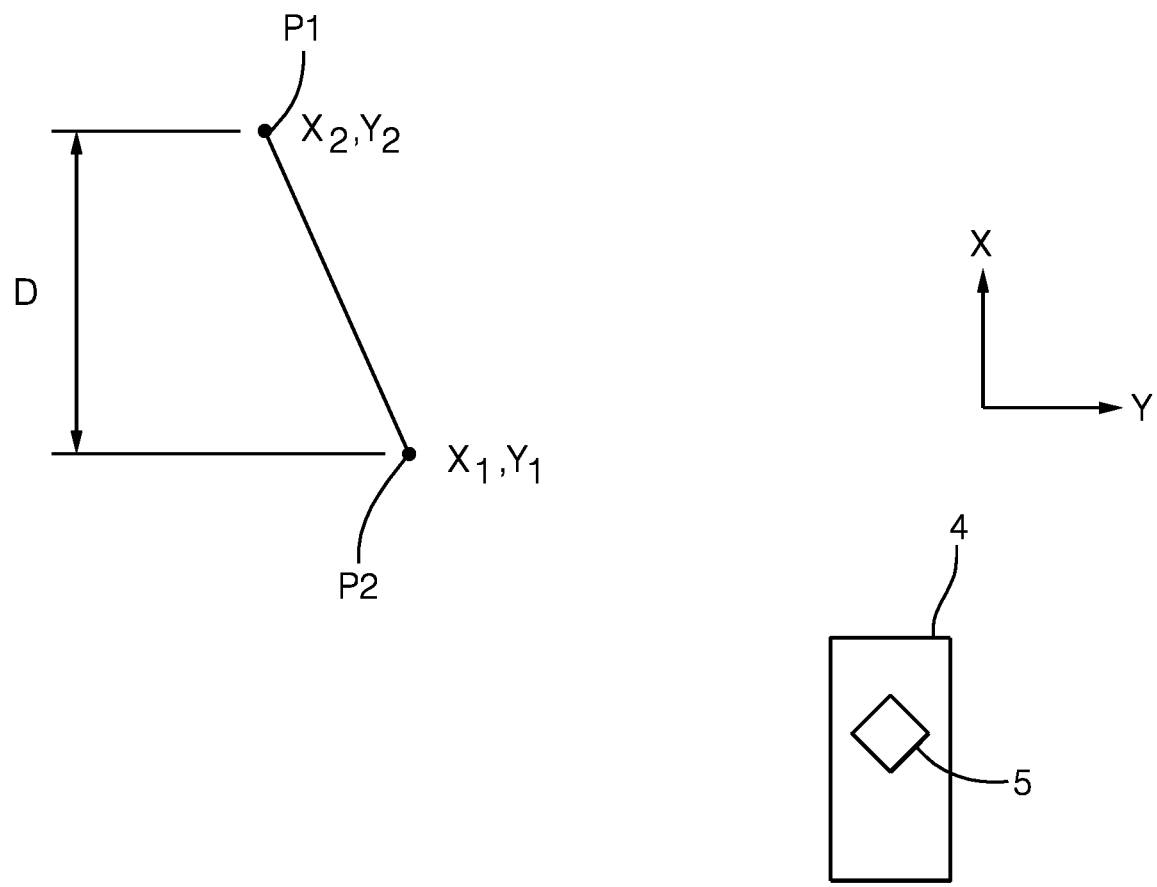

A further input is the difference in X co-ordinates in the real world of the two points, which is designated D. In FIG. 3a this is shown as D which is the length of the line marker. However here the lane marker is parallel to the direction orientation of the vehicle.t is to be noted than as seen in FIG. 4, which is similar to FIG. 3a with like reference numerals, the line joining the point in the real world may not be parallel to the X axis; in this case the difference between the X coordinates D is a shown.

In some examples the actual real world co-ordinates of the two points (XW1,YW1) and (XW2,YW2) respectively may be known or determined from other well-known techniques. The value of D can therefore be calculated as (Xw1−Xw2).

Alternatively, the value of D may be calculated or determined otherwise. It may be that the points P1 and P2 represents the ends of lane markers, and these have a standard length. Where the car is orientated in the example of FIG. 3a, parallel to the X axis, then the value of D is the same as the length of the line marker. Thus, the exact co-ordinates do not need to be known. If the orientation of the vehicle/camera relative to the line marker is known and the length L of the lane marker is known, then the value of D (difference in the Y co-ordinate values) can be determined (se FIG. 4).

Step 4

With the known tilt/pan angles and the coordinates of the image points where the measurements were performed, the set of coefficients $a_i$, $b_i$, $c_i$, $d_i$, assigned to each of the two points Pi where i=1,2 are calculated from the equations listed above. So, in other words $a_1$, $b_1$, $c_1$, $d_1$, and $a_2$, $b_2$, $c_2$ $d_2$ are calculated form the following equation:

$a_i = \sin\theta * f + \cos\theta * y_{I,i}$ $bi = -\cos\theta * xI,i$ $ci = -\cos\eta \cos\theta * f + \sin\eta * xI,i + \cos\eta \sin\theta * yI,i$ $di = -\cos\eta \sin\theta * xI,i + \sin\eta * yI,i$ where i=1 and 2.

Using the known camera height and the measured world distances, the roll angle is calculated by the equation:

$\rho = [D/h - (c_2/a_2 - c_1/a_1)] / [(a_2d_2-b_2c_2)/a_2^2 - (a_1d_1-b_1c_1)/a_1^2]$.

Regarding the raw data for input into the methodology it is only required that the real world distance between two points is estimated or known in the X axis. Thus, although estimation/determination of two world points may be used, only the distance between them in the X-direction is required. Thus if road markings such as straight white lines have a standard length then this length can be used, if it is assumed the host vehicle is oriented parallel to the road markings, which would be the case when travelling along a straight road, particularly if the calculations were averaged. In this case the world co-ordinates do not need to be known. So, it is to be noted that in the above example the distance of the world points is needed only in X axis direction; i.e. the distance between the two points is given relative to the X direction. The invention is not limited to this; the distance D can be determined for any axis or any orientation of the axis in the real world as long as the axis of the imager corresponds to this.

Other

Distance measurements in World co-ordinates may be performed by any appropriate method as mentioned such as described in the Applicants co-pending European Patent Application EP 15 151 429.6 which describes camera height calibration In fact it would be very efficient to combine the presented method with the camera height calibration. After camera height has been successfully estimated, the measured and stored distance measures can be reused to estimate camera roll angle at nearly no additional cost. However, the roll angle calibration also can be used stand-alone if proper distance measures are used, e.g., the autocorrelation technique used in the above referenced EP Patent application. If roll angle calibration is to be performed as an independent step, world distance measures can be performed by similar technique like described in the applicants co-pending application, i.e., detection of "rectangular" brightness signals in multiple fixed scan-lines, autocorrelation of the signals to get timing information which can be converted to distance by comparing to speed. Other ways of distance measure are possible.

Statistical filtering of measures may be used to improve robustness of method: statistical filtering of roll angle estimations may be performed to make the method more robust. If the filtering of the roll angle results shows a predefined precision condition is met, the algorithm stops (exit condition). If the exit condition is not yet met, the algorithm loops back to the next distance measurement (or, evaluation of stored data in case of measurement reuse from previous height calibration).

Tests

Matlab tests were performed to assure that the linearization and the Taylor expansion used to estimate p do not introduce errors which can't be neglected. The test incorporated for a fixed world and image point the cone section produced by a full 360° roll, the (linearized) tangent on it and the Taylor approximation of the tangent. Comparison of the Matlab graphs show that x distance measurement points at constant y offset left or right of the center yields the best approximation.

Figure 5:
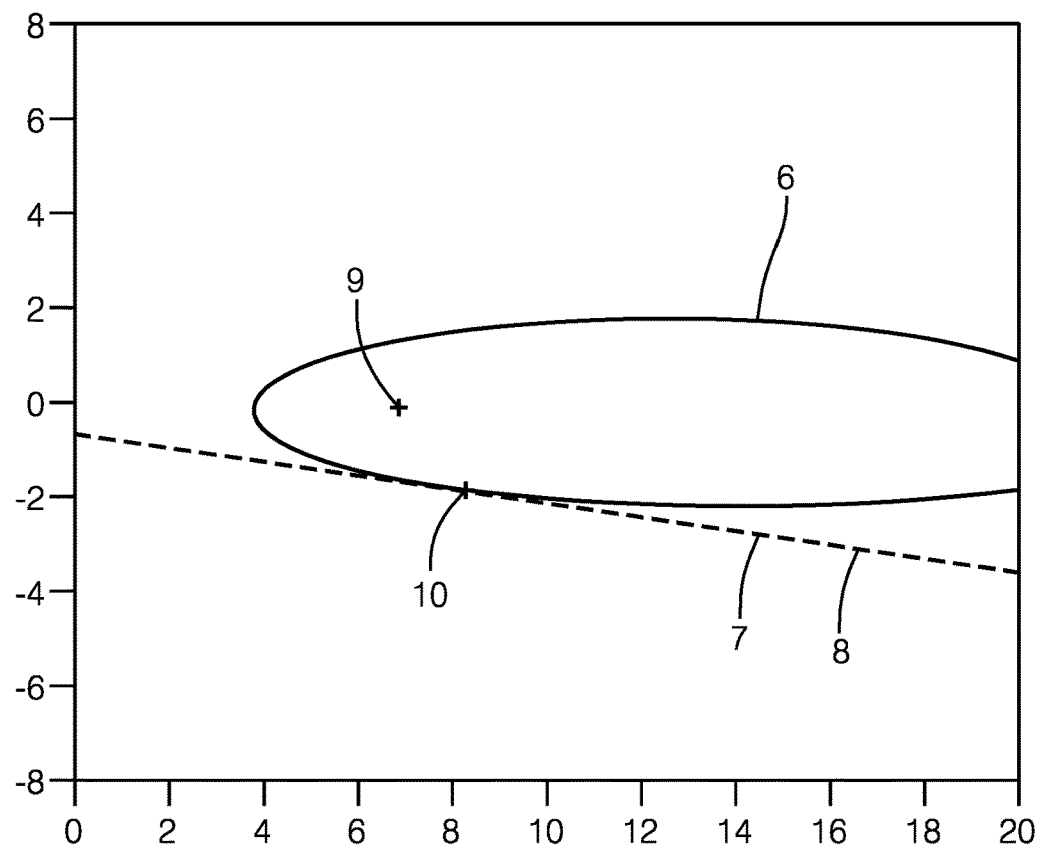
FIGS. 5, 6, and 7 show results of the methodology.

FIG. 5 shows the projection of image point, giving true roll curve 6, at imager coordinates (−200, 50 degrees) to World ground plane for full 360 degrees camera roll with a tilt of −17 degrees, yaw 1 degree and height h of −2.1 m. The linear "roll" sin/cos approx. is shown by reference numeral 7; reference numeral 8 shows the linear Taylor series which is approximately generally co-incident with 7. Point 9 gives the intersection of the optical axis, and 10 is the projected point with 0-degree roll.

Figure 6:
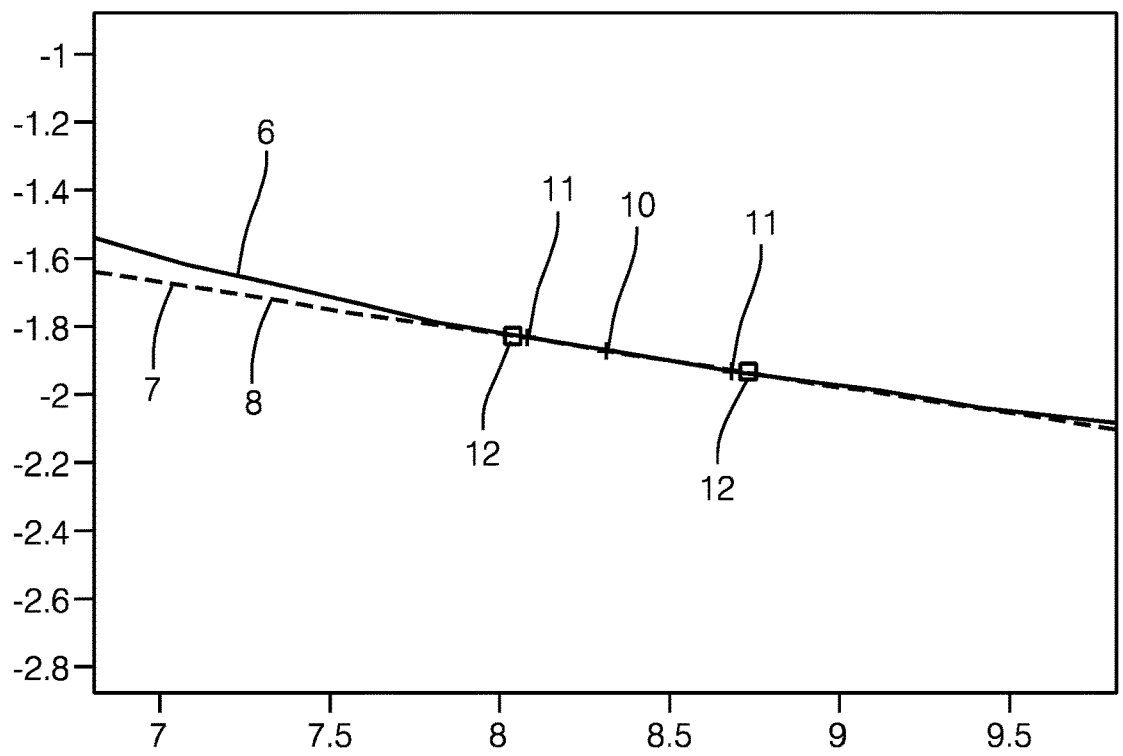

FIG. 6 shows an enlarged (detailed) view of a portion of the FIG. 5. Points 11 shows true variation of world point for +/−2.8 degree roll angle and the estimated ones using the above methodology (via linearization and Taylor expansion) is shown by reference numerals 12. Other reference numeral are the same for FIG. 5.

Figure 7:
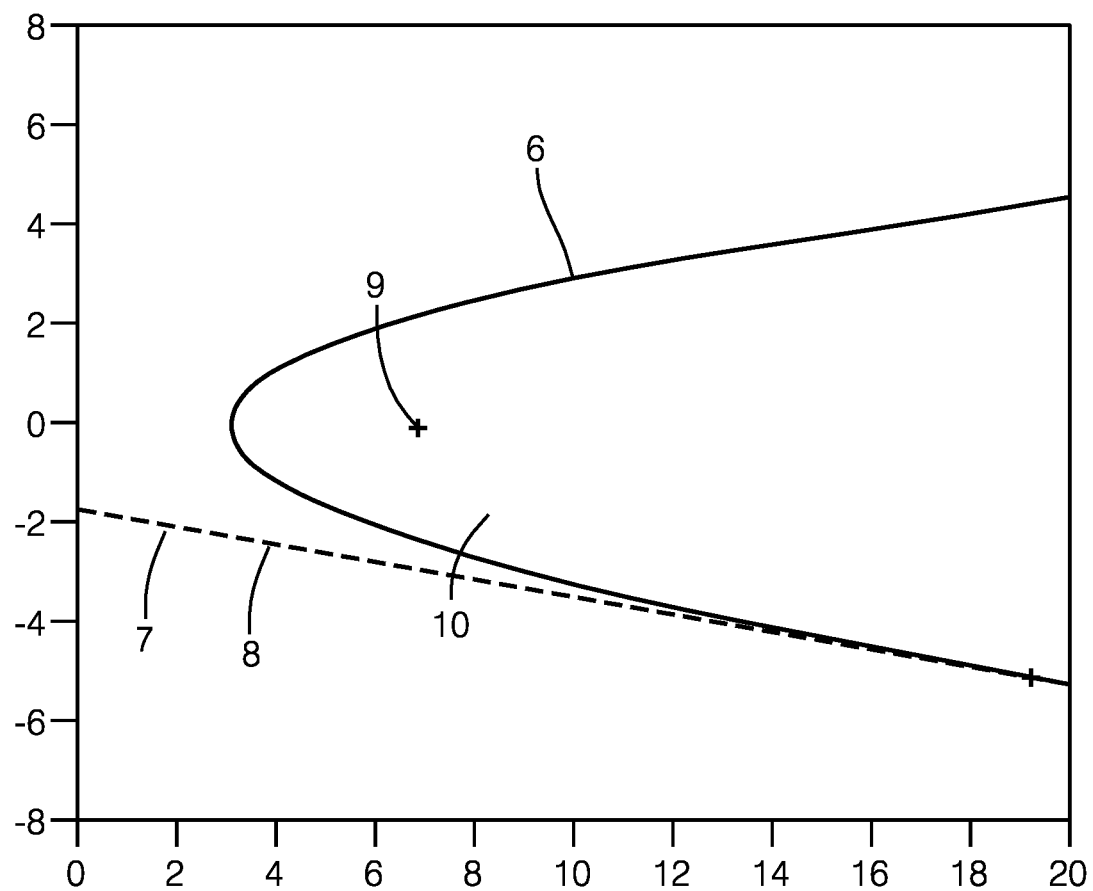

FIG. 7 shows the projection of image point, giving roll curve, at imager co-ordinates (−250,190 degrees) to World ground plane for full 360 degrees camera roll with a tilt pf −17 degrees, yaw 1 degree and height h of −2.1 m. The reference numerals are as with FIG. 5. As the figure shows, the method is not restricted to elliptical cone sections but also works for parabolas and hyperbolas.

While this invention has been described in terms of the preferred embodiments thereof, it is not intended to be so limited, but rather only to the extent set forth in the claims that follow.

I claim:

1. A method of determining a roll angle of a camera mounted on a host vehicle comprising:
   a) defining Cartesian axes in a real world coordinate system and corresponding axes in a corresponding coordinate system of a camera imager;
   b) from an image taken from the camera, determining corresponding coordinates of two points (P1, P2) of the real world coordinate system, in the camera imager ((x I,1, y I,1), (x I,,2, y I,2));
   c) determining a difference (D) in the coordinates of the two points (P1, P2) in a horizontal World plane in one axis of the real world coordinate system (Xw,1−Xw,2), using the corresponding coordinate system as in step b); and
   d) determining a roll angle ρ of a camera located on a host vehicle from a following formula:

$\rho=[D/h-(c_2/a_2-c_1/a_1)]/[(a_2d_2-b_2c_2)/a_2^2-(a_1d_1-b_1c_1)/a_1^2]$, where $a_1$ and $a_2$ are found from the following, where i=1,2 represents the two points (P1,P2):

$a_i = \sin \theta * f + \cos \theta * y_{I,i}$, $b_i = -\cos \theta * xI,I$, $c_i = -\cos \eta \cos \theta * f + \sin \eta * xI,i + \cos \eta \sin \theta * yI,I$, and $d_i = -\cos \eta \sin \theta * xI,i + \sin \eta * yI,I$, where for θ is a known value of fixed tilt angle, η is the known value of fixed pan angle and h is a known fixed camera height h, and
   $x_{I,i}$, $y_{I,i}$ are the respective coordinates of the two points (P1,P2) in the imager.

2. A method as claimed in claim 1 wherein in step a) axes are defined as a X-axis which is in a direction of travel or an orientation of the vehicle forwards and the Y-axis is perpendicular to the X-axis.

3. A method as claimed in claim 1 where step c) is performed using data from a known coordinate position of the two points (P1,P2) in the real World.

4. A method as claimed in claim 1 where the two points (P1,P2) are end points of a lane marking, the lane marking being of pre-determined length (L), and determining a value of the difference (D) from a lane marking length and a known orientation of the camera or a vehicle angle relative to the lane marking.

* * * * *